United States Patent [19]

Hansen

[11] 4,346,424
[45] Aug. 24, 1982

[54] ELECTRONIC REMOTE CONTROL D.C. POWER CONTROLLER AND CIRCUIT BREAKER

[75] Inventor: James E. Hansen, Oak Creek, Wis.

[73] Assignee: Eaton Corporation, Cleveland, Ohio

[21] Appl. No.: 123,593

[22] Filed: Feb. 22, 1980

[51] Int. Cl.³ .................... H02H 3/093; H02H 3/087
[52] U.S. Cl. .................................. 361/94; 361/111; 361/87
[58] Field of Search .................. 361/93, 94, 96, 97, 361/87, 86, 110, 111; 330/258, 252

[56] References Cited

U.S. PATENT DOCUMENTS

| | | |
|---|---|---|
| 3,327,171 | 6/1967 | Lipnitz et al. |
| 3,444,434 | 5/1969 | Zocholl |
| 3,508,115 | 4/1970 | Drushel ............................ 361/87 |
| 3,668,483 | 6/1972 | Kellenbenz |
| 3,697,813 | 10/1972 | Fox |
| 3,731,151 | 5/1973 | Ozawa ............................. 361/87 |
| 3,846,676 | 11/1974 | Ryczek et al. |
| 3,968,410 | 7/1976 | Graham |
| 4,006,387 | 2/1977 | Hudak ............................. 361/87 |
| 4,017,766 | 4/1977 | Vercellotti et al. ................ 361/83 |
| 4,032,766 | 6/1977 | Hughes et al. .................. 361/93 X |
| 4,060,844 | 11/1977 | Davis et al. ...................... 361/96 |
| 4,104,691 | 8/1978 | Shimp ............................. 361/96 |
| 4,152,743 | 5/1979 | Comstock .................... 361/111 X |
| 4,162,456 | 7/1979 | Lukes ........................... 330/258 X |
| 4,242,741 | 12/1980 | Parrish ........................ 330/258 X |

*Primary Examiner*—Patrick R. Salce
*Attorney, Agent, or Firm*—C. H. Grace; W. A. Autio

[57] ABSTRACT

An electronic remote control D.C. power control and overload circuit breaker for the cockpit controlled D.C. power system of an aircraft or the like. Electronic sensing of overcurrent conditions provides better accuracy, stability and reliability and easier adjustment or adaptation to specific applications. These are attained by using a combination of a shunt resistor in the D.C. line feeding a transient suppressing input bridge and an instrumentation amplifier with common mode rejection followed by a trip time delay network, a threshold comparator and logic and relay control circuitry, as well as supply voltage regulation plus secondary regulation of the comparator reference voltage. A remote cockpit unit affords control and indication. Modifications afford bidirectional sensing of the D.C. bus overload as well as different trip time delays for the two polarities of overload currents.

9 Claims, 6 Drawing Figures

ELECTRONIC REMOTE CONTROL D.C. POWER CONTROLLER AND CIRCUIT BREAKER

BACKGROUND OF THE INVENTION

Electronic controlled circuit breakers have been known heretofore. For example, L. J. Ryczek et al U.S. Pat. No. 3,846,676, dated Nov. 5, 1974, assigned to the assignee of this invention, discloses an electronic remote control circuit breaker (RCCB). However, while the control circuit in such patent is electronic that remote control circuit breaker nevertheless relies on bimetal elements in the 3-phase power line to sense an overload current and trip the power contacts of the main breaker open. This causes closure of overload trip contacts to operate a remote pilot breaker as an indication and to energize the trip coil of the main breaker to maintain the power contacts open and to reset the overload trip contacts open. Also, W. L. Rutchik et al copending application Ser. No. 923,325, filed July 10, 1978, assigned to the assignee of this invention, discloses an electronic remote power controller that will respond to an overcurrent in a 3-phase power line to trip the power contacts open. Such remote power controller (RPC) uses current rate sensing toroids around the power terminals of a 3-phase A.C. relay to enable inclusion of all the parts thereof in an integrated package of minimum size and weight.

A D.C. solid state circuit breaker is shown in C. W. Kellenbenz U.S. Pat. No. 3,668,483, dated June 6, 1972. In such D.C. circuit breaker, SCR's are used as the switching devices in the D.C. power line and are turned on manually and tripped off in response to an overcurrent signal. The turn-on signal is provided by a relay that operates a multivibrator that drives a dual-transistor switch to gate the SCR's. An overcurrent signal from a shunt in the D.C. power line is applied through ground-referenced amplifiers to a commutation circuit to turn the SCR's off. Also, D. A. Fox U.S. Pat. No. 3,697,813, dated Oct. 10, 1972, shows a D.C. circuit breaker of the overcurrent static switching type. In this patent, an overcurrent signal obtained from a shunt in the D.C. power line is regulated by a transistor circuit to allow operation over a range of 11 to 80 volts on the D.C. line. This signal is then amplified and compared with a reference, the resultant of which is compared with another reference modified by said amplified signal to obtain a trip signal to a static power switch circuit.

While these prior circuit breaker systems have been useful for their intended purposes, this invention relates to improvements thereover.

SUMMARY OF THE INVENTION

The purpose of this invention is to provide an improved electronic remote control D.C. power controller and circuit breaker means wherein electronic sensing and control techniques are employed rather than the more conventional bimetal heaters or magnetic breakers. Electronic sensing and control afford higher accuracy and ease of adjustment, greater stability through temperature changes and aging, reduced susceptibility to shock, vibration, etc. Additionally, it is possible easily to change trip-time curves and cool-down times to suit any particular desired characteristics by merely selecting component values or altering circuit configurations. Control logic functions are also flexible with electronic circuitry.

An object of the invention is to provide an improved electronic remote control D.C. power controller and circuit breaker.

A more specific object of the invention is to provide an improved high current D.C. circuit breaker.

Another specific object of the invention is to provide an improved D.C. remote control and indicating circuit breaker.

Another specific object of the invention is to provide an improved D.C. circuit breaker of the aforementioned type having a balanced bridge with transient suppression to obtain an accurate differential overcurrent signal from a D.C. shunt.

Another specific object of the invention is to provide an improved D.C. circuit breaker having a differential overcurrent signal applied to floating amplifiers for common mode rejection.

Another specific object of the invention is to provide an improved D.C. circuit breaker of the aforementioned type with solid state overcurrent sensing and signal developing means for tripping a main D.C. power contactor.

Another specific object of the invention is to provide an improved D.C. circuit breaker of the aforementioned type with remote on-off control and trip indicator means.

Another specific object of the invention is to provide an improved solid state D.C. circuit breaker of the aforementioned type that is temperature stable and not affected by transients and power line voltage variations.

DESCRIPTION OF THE PREFERRED EMBODIMENT

Figure 1:
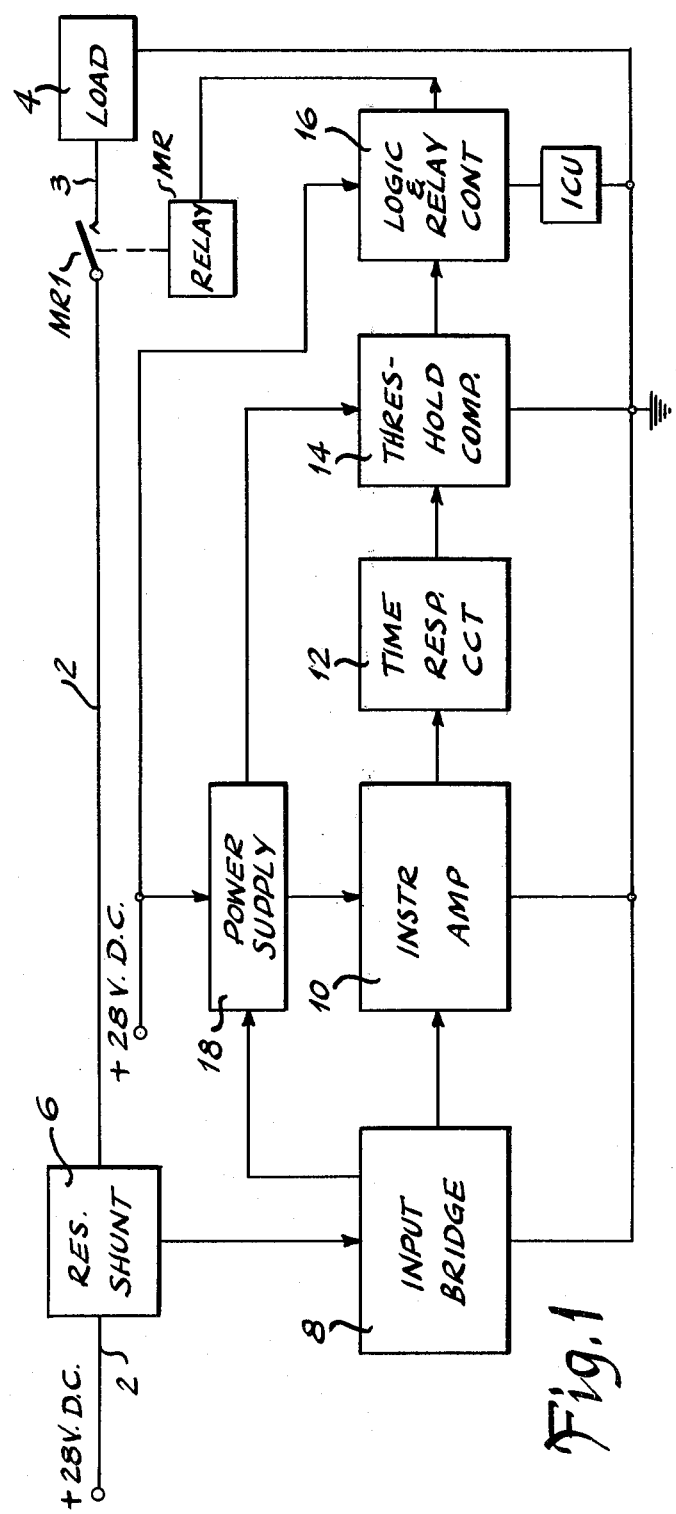
FIG. 1 is a block diagram of the electronic remote control D.C. power controller and circuit breaker systems constructed in accordance with the invention.

Referring to FIG. 1, there is shown a block diagram of an electronic remote control D.C. power controller and circuit breaker system constructed and arranged in accordance with the invention. The function of this device is to serve as an electric power contactor (or relay) to connect power from a 28 volt D.C. source to a bus or load device as well as to disconnect power therefrom when desired. Such connection and disconnection of power is controlled from a manually-operable indicator control unit situated at a remote location such as the pilot's cabin of an aircraft.

In addition, this device serves as a circuit breaker having solid state tripping means that responds to overcurrent conditions sensed by a resistance shunt to trip the power contactor open and protect the D.C. bus and/or the load device. The solid state tripping means upon activation also deliberately applies a tripping value of current to the indicator control unit to trip it open thereby to open the power contactor circuit following tripping of the latter as well as to provide a visual indication that such power contactor has tripped.

For secondary protection, a thermal breaker senses the resistance shunt temperature and, in the event of a fault, opens the power contactor circuit.

As shown generally in FIG. 1, a D.C. source of 28 volts or the like is connected to line 2 with reference to ground. This D.C. line supplies power to a D.C. bus 3 and therethrough to a load 4 under the control of a power contactor or main relay MR having a contact MR1 in the supply circuit. A resistance shunt 6 is connected in D.C. line 2 and provides a voltage signal proportional to the line current to an input bridge 8 that is referenced to ground. Input bridge 8 applies a line-current proportional voltage to an instrumentation amplifier 10 whereafter the amplified signal is applied to a time response circuit 12 to afford the desired trip time delay. The output of this time response circuit is applied to a threshold comparator 14 which provides a trip signal output whenever the input signal thereto exceeds a predetermined reference signal. This trip signal output is then applied to a logic and relay control circuit 16 that controls main relay MR. Operating power is applied from the 28 volt D.C. source to this logic and relay control circuit 16 and the latter is connected through a remote indicator control unit ICU to ground. Operating power is also applied from the 28 volt D.C. source through a power supply circuit 18 to amplifier 10 and threshold comparator 14 which are connected to ground. Input bridge 8 is connected to power supply circuit 18 for transient voltage suppression as hereinafter more fully described.

Figure 2A:
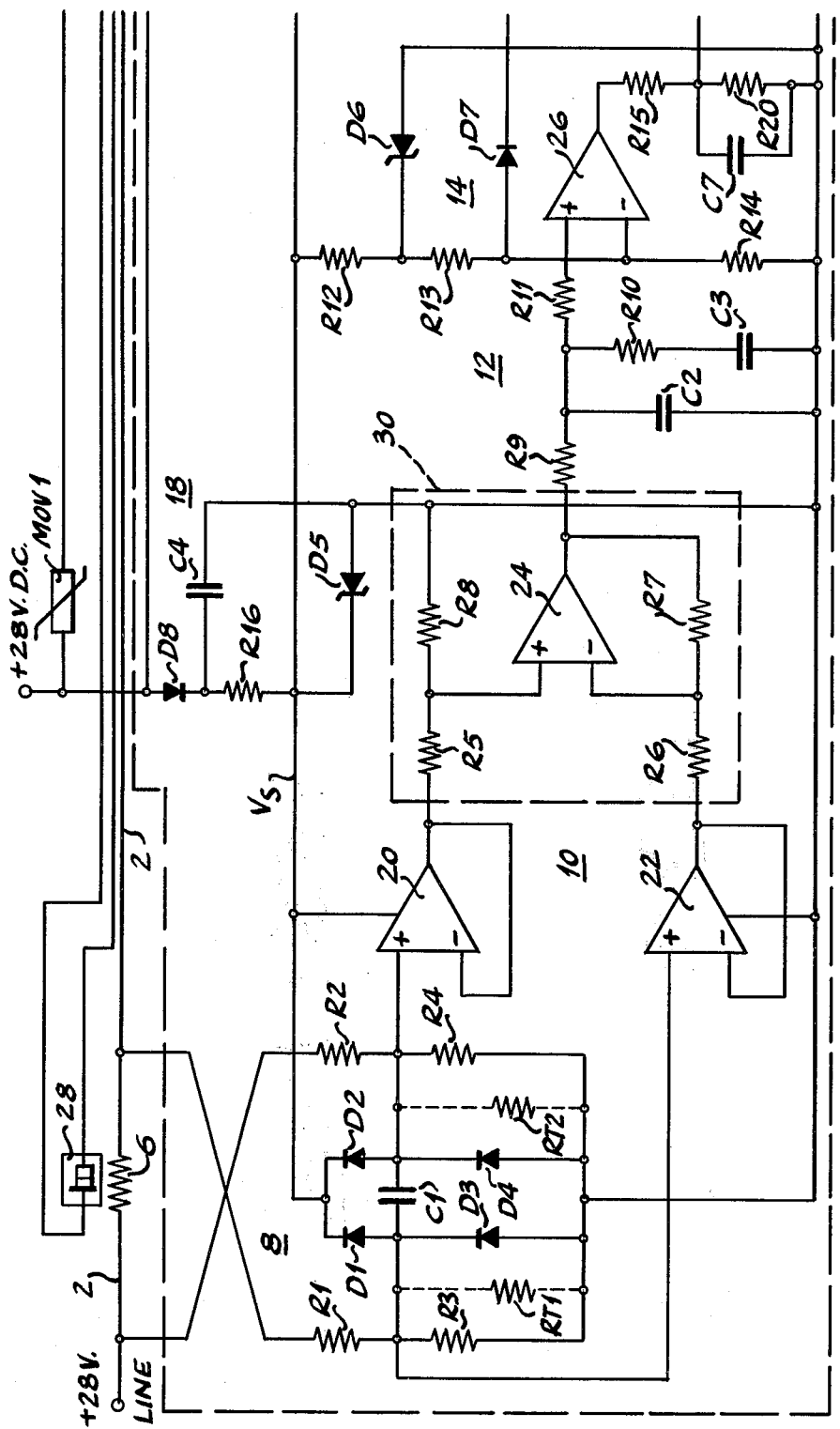
FIGS. 2a–b is a circuit diagram of the system of FIG. 1 showing the same in greater detail.
Figure 2B:
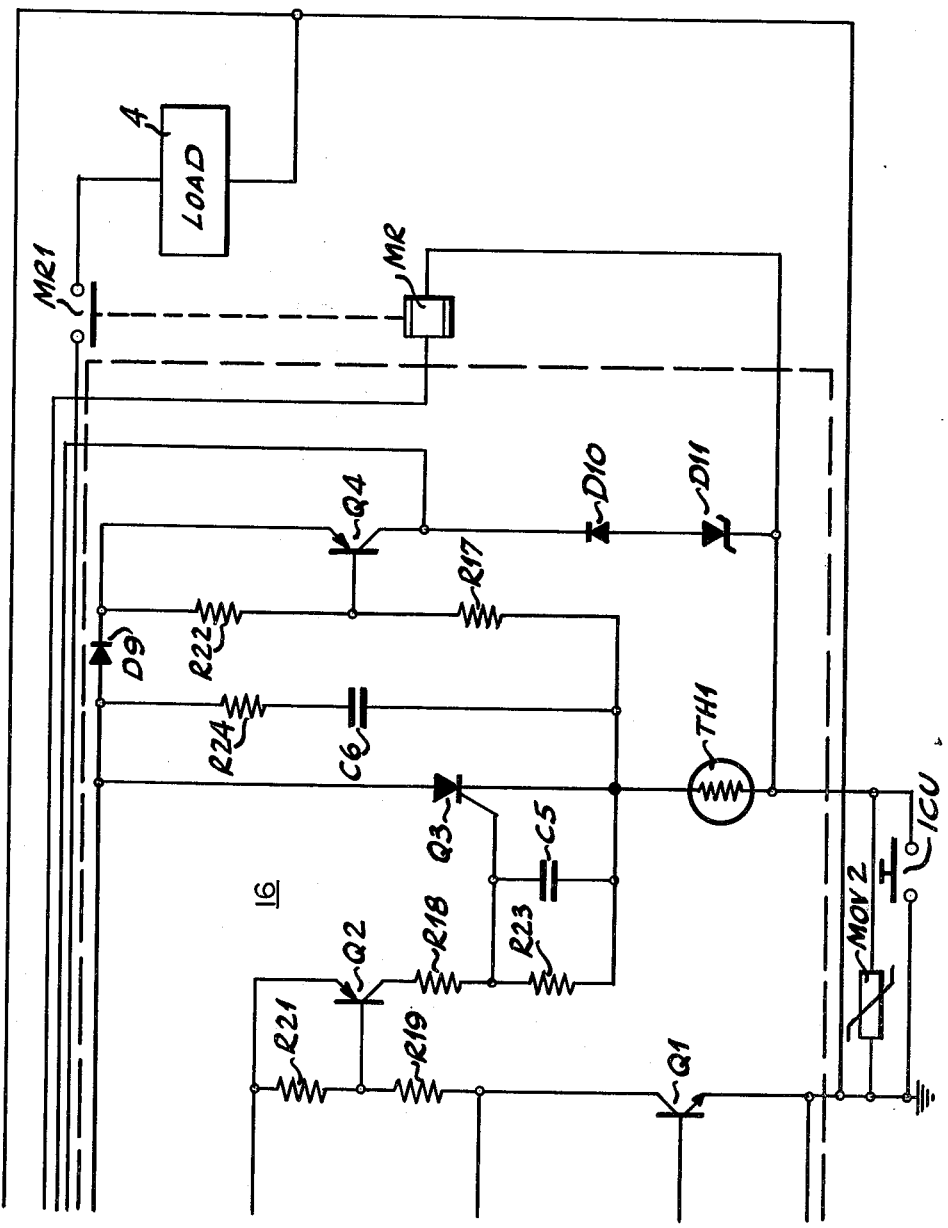

This system shown in block diagram form in FIG. 1 is shown in more detail in FIGS. 2a–b. Essentially, the overall function is to sense a small voltage across shunt resistor 6 in the D.C. bus to be protected, this voltage being proportional to the current through the shunt. This small voltage is linearly amplified in the electronic circuit and then is fed to a threshold switching comparator by means of a time responsive network which produces a delay characteristic. The output of the comparator then drives logic circuitry which controls main relay MR that is in the sensed current line. If an overcurrent condition occurs, the situation is detected by the voltage sensing circuit across the shunt as an increase in voltage drop. The signal is amplified and, if high enough, will exceed the predetermined level set at the comparator to trip open the relay. A time delay occurs between the signal at the amplifier output and the comparator input. The delay time is a function of the magnitude of the amplifier output signal. The greater the magnitude, the shorter the time required to charge the delay circuit output up to the trip threshold of the comparator. With proper selection of trip threshold and time delay network components, a trip time versus overload current curve similar to that of a conventional bimetal breaker device can be accomplished, thus providing a desired protection characteristic.

Referring to FIG. 2a, shunt resistor 6 is shown at the upper left-hand portion. This resistor is a low resistance precision, stable shunt element placed in series with the current carrying line to be protected. Preferably, it is arranged to provide a 25 millivolt signal with 200 amperes flowing through it. Thus at a 1000 percent overload (2000 amperes), it will provide a 250 millivolt signal to the electronic circuit.

Input bridge 8 shown at the left-hand portion of FIG. 2 forms a balanced resistance bridge having resistors R1, R2, R3 and R4 connected in bridge configuration. As shown by dotted lines, a trimming resistor RT1 may be connected across resistor R3 or a trimming resistor RT2 may be connected across resistor R4 to trim instrumentation amplifier 10 for various offset errors and to balance the bridge. This bridge network drops the 28-volt nominal line voltage down to a level compatible with the common mode input voltage range of the instrumentation amplifier.

This input bridge also comprises means affording input circuit protection from positive and negative transient voltages on the line which might otherwise damage the instrumentation amplifier inputs. This means comprises diodes D1, D2, D3 and D4. Diode D1 is connected from the left or negative output side of the bridge through regulating diode D5 in power supply circuit 18 to ground. Diode D2 is connected from the right or positive output side of the bridge through regulating diode D5 to ground. Diode D3 is connected from ground to the left or negative output side of the bridge. And diode D4 is connected from ground to the right or positive output side of the bridge.

As a result, if a positive transient voltage occurs on the line which, even when divided through the bridge circuit, still exceeds the operating voltage of the amplifier as determined by the internal regulated voltage Vs that is regulated by diode D5, diodes D1 and D2 will clamp the transient voltage through regulating diode D5 to voltage Vs. At the same time, resistors R1 and R2 will limit the current resulting from the clamping action. A negative voltage transient on the line which goes below "0" ground level will be clamped by diodes D3 and D4 to ground level and the current will be limited by resistors R1 and R2, and thus the input voltage to the amplifier is prevented from going negative. Capacitor C1 suppresses electrical "noise" on the differential input signal. The bridge resistors are very stable or at least the two legs of the bridge drift in the same direction with temperature change and aging in order to prevent undesired offset which otherwise would result in an input signal differential falsely simulating an actual signal from the shunt. Diode reverse leakage currents are low to prevent bridge unbalance. Diodes are used on both sides of the bridge to prevent a differential voltage from being seen by the amplifier during a transient interval.

As shown in FIG. 2a, instrumentation amplifier 10 comprises three operational amplifiers 20, 22 and 24 and resistors R5, R6, R7 and R8. With the positive and negative output sides of the input bridge connected to the non-inverting inputs of operational amplifiers 20 and 22, respectively, and the outputs of the latter connected to the non-inverting and inverting inputs of operational amplifier 24, the instrumentation amplifier provides precision amplification of the differential input signal and also provides excellent rejection of "common mode" input voltage variations. That is, the amplifier is capable of amplifying the small millivolt level signal on its "floating" differential input as supplied by the shunt through the input bridge, but is not affected by variations in the 28-volt line voltage which may vary from about 10 to 35 volts D.C. Such rejection of the "common mode" input voltage variation is extremely important for accuracy of operation in the intended use of this overcurrent sensing system.

For this purpose, the three operational amplifiers are all contained on the same integrated circuit chip so as to provide a buffered input difference amplifier having optimum tracking and balance. Amplifiers 20 and 22 are input source followers where one side of the input differential signal from the bridge is fed to the input of amplifier 20 and the other side thereof is fed to the input of amplifier 22. Thus, the differential input signal from the shunt and bridge is reflected to the outputs of "floating" amplifiers 20 and 22. The two input amplifiers 20 and 22 are unity gain elements that isolate the difference amplifier 24 and resistors R5, R6, R7 and R8 from the input bridge. The outputs of amplifiers 20 and 22 are low impedance driving points with a differential signal identical to the differential voltage on their inputs. These low output impedances are particularly important for the modified versions having bidirectional sensing as two individual difference amplifiers will have to be driven from these points with no interaction as hereinafter described in connection with FIGS. 4 and 5.

This differential signal is then amplified by the differential amplifier comprising element 24 and resistors R5, R6, R7 and R8. The voltage gain is a function of the resistance ratios. If R7 equals R8 and R5 equals R6, the voltage gain is approximately $AV \cong R7/R6 = R8/R5$.

Also, the amplifier not only amplifies the differential signal and provides the necessary common mode rejection, but also converts its output signal to a single ended voltage referred to ground that is necessary for the subsequent circuitry rather than continuing the floating differential signal. Therefore, the amplifier output signal can be processed by successive circuitry against a ground reference.

The gain of the amplifier is established such that the maximum shunt overload signal to be observed (1000 percent) is still reflected as a linear change on the amplifier output, that is, the amplifier does not saturate. Thus a plot of shunt voltage versus amplifier output voltage will be nearly linear over the intended range.

As shown in the middle of FIG. 2a, the output signal from the amplifier is fed to a time delay network 12 to provide the signal with the desired trip-time behavior. This time delay network comprises resistors R9 and R10 and capacitors C2 and C3. These elements form an RC type integrator network that provides a time delay between a step impulse signal input and the network output. Due to the particular time delay response required by the specific application and intended use of this system, a dual RC network is necessary whereby resistor R9 and capacitor C2 primarily determine the shape of the trip characteristic at high overload levels whereas resistors R9 and R10 and capacitor C3 primarily determine the shape of the trip characteristic at low overload levels. Assuming that the trip threshold is set at 125 percent of rated current, as hereinafter described, if an overload input signal at 126 percent of rated current is introduced at the network input, it will take much longer for the network output to charge up to the 125 percent trip point than if an 800 percent overload signal enters the network input, since in the latter case the RC charge asymptote is much steeper and the 125 percent threshold charge level is attained much sooner. The RC network time constant itself is, of course, the same with regard to charging to an asymptote equal to the input signal regardless of the level of the input signal. However, if a specific level of output voltage is to be attained, it is obvious that it will be reached sooner with increasingly higher input signal levels which are charging to steeper asymptotes. The elements in such RC networks are given values to provide the desired response as shown by the curve in FIG. 3.

Immediately following this time delay network there is a voltage comparator whose threshold level is trimmed to a value corresponding to the desired ultimate trip level of sensed line current. For bimetal breakers, this value is approximately 125 percent of rated current, that is, about halfway between 115 percent (must not trip) and 138 percent (must trip). Thus, 125 percent is the point to which the comparator is trimmed as hereinafter described.

The threshold voltage comparator 14 is shown in FIG. 2a directly to the right of time delay circuit 12. This comparator comprises an operational amplifier 26, an input resistor R11 connecting the output of time delay network 10 to the non-inverting input of amplifier 26, a reference voltage supply circuit comprising resistor R12 connected to regulated voltage conductor Vs, and a regulator zener diode D6 connected from resistor R12 to ground, an adjustable voltage divider comprising a resistor R13 and a trim resistor R14 connected in series from the junction of resistor R12 and diode D6 to ground with the junction therebetween connected to the inverting input of amplifier 26, and a switching diode D7 that provides hysteresis on the switching threshold. The threshold value of the comparator is set by selecting the value of trim resistor R14.

The operation of the comparator is such that as long as the input signal through resistor R11 to the non-inverting input of amplifier 26 is below the threshold level established at the inverting input of the latter, the output of the comparator is at a low state. When the input signal attains the threshold level in response to an overcurrent condition on the line, this threshold level being predetermined by the regulator diode D6 and resistor R13 and trim resistor R14, the op amp output abruptly changes state, due to its high voltage gain, to a high state and this signal is used as a logic signal to bias on the base of transistor Q1 through input resistor R15. Immediately, thereupon, succeeding logic circuits cause the main control relay to be de-energized breaking the load circuit. While the collector of transistor Q1 has turned on to drive the succeeding logic circuits, it has also pulled the cathode of diode D7 low and consequently clamped the reference voltage at the inverting input of the comparator to a low value thus providing a "snap" action on hysteresis. As a consequence, the RC time delay network must discharge back through resistor R9 and the now low output level of amplifier 24 before the logic circuit can be reset. This provides a cool down delay for the system preventing rapid reset action which could cause consequent damage to the protected line. The output of amplifier 24 when low when the input to it when low when the relay interrupted the line current flow.

In order for the threshold regulator circuit to be stable even when the supply voltage drops drastically, the resistor R12, diode D6 reference voltage regulator is used supplementally to the main regulator diode D5.

The power supply circuit 18 shown at the upper central portion of FIG. 2a is supplied from a 28 volt D.C. source which may be different or the same source that supplies power to line 2. This 28 D.C. source is connected through a diode D8 and a resistor R16 to regulated voltage conductor Vs which is connected through zener diode D5 to ground, with the junction between diode D8 and resistor R16 connected through a filtering and noise suppressing capacitor C4 to ground. Diode D8 functions as a reverse polarity blocking element and additionally prevents capacitor C4 from being rapidly discharged during abrupt drops in the positive 28 volt supply. Resistor R16 acts as a current limiting element into the zener diode voltage regulator D5. This zener diode keeps the supply voltage Vs to the electronic circuitry regulated over a wide variation of input voltage. Additional regulation is provided at the comparator circuit by the use of resistor R12 and diode D6 to insure the maintenance of a precision reference over a wide range of conditions.

The aforementioned logic and relay control circuit 16 is shown at the left-central portion of FIG. 2b. As shown therein, the positive 28-volt source is connected through a diode D9, a PNP power transistor Q4, a thermal breaker 28, the coil of relay MR, and an external or remote control switch such as indicator control unit ICU to ground.

In this main relay coil conduit, when unit ICU is grounded (closed) and the base of transistor Q4 is thus returned to ground through resistor R17 and thermistor element TH1, transistor Q4 is biased into "on" condition and its collector is pulled high causing current to flow through the relay coil energizing the same and closing contacts MR1. When unit ICU is open, both the base and collector paths of transistor Q4 as well as the relay coil circuit are open, thus the relay contacts are open.

This basic switching scheme is controlled by the preceding logic circuit as hereinafter described. Silicon controlled rectifier Q3 is in shunt with the emitter base circuit of transistor Q4 to control the latter. If, when unit ICU is closed and the relay consequently energized, a logic signal is applied to the gate of SCR Q3, corresponding to an overload trip condition, SCR Q3 is turned on. The cathode of SCR Q3 is pulled upward toward its anode potential. The base bias to transistor Q4 through resistor R17 is now bypassed and transistor Q4 is turned off, de-energizing the relay immediately. In addition to this, the top side of thermistor TH1 is pulled high by the cathode of SCR Q3. Prior to this, only a low current had flowed through thermistor TH1, limited by the base of transistor Q4 and resistor R17. Resistor R17 is comparatively high such as 1.8 Kilohms as compared to thermistor TH1 which is low such as approximately 10 ohms. Now the current through thermistor TH1 is limited only by its own small resistance in series with the low resistance of the unit ICU line and the low forward drop of SCR Q3, all of which are now directly across the +28 volt line to ground. As a result, a high current flows sufficient to cause unit ICU to trip open.

Indicator control unit ICU is a circuit breaker having a thermal or magnetic element that opens the contacts upon high current flow therethrough. It also has a reset button that may be pushed to reset the contacts closed. This button has an indicator such as a white band at its root that extends out upon tripping to indicate its tripped condition and which band disappears within the housing when the button is pushed to reset the same, or other trip indicating means. For example, an Airpax Electronics, Inc., ¾ to 1 Ampere Style AP1, or a Mechanical Products, Inc., Part No. 1500-052-075 circuit breaker could be used therefor.

Since this indicator control unit ICU is a remotely located device such as being located in the aircraft cockpit whereas the RCCB is located elsewhere in the aircraft, when it trips open, it gives an indication that the main contactor of the RCCB has tripped open. Once SCR Q3 has been gated on, it will remain on even if its gate signal is removed. It can be turned off only when anode current is interrupted which occurs when unit ICU trips open. Thus, SCR Q3 maintains current to unit ICU until it trips even though this may take a period of time subsequent to the opening of the main relay MR which occurs immediately after Q3 is turned on. Once opened, unit ICU can be used to reclose the relay logic circuit in a normal "on" sequence as long as no trip signal exists on the gate of SCR Q3. Such a signal may still exist if the cool-down discharge circuit previously described is still holding the comparator output high. In such case, unit ICU will be immediately retripped open without having permitted relay closing. If cool-down is completed, the relay will close when unit ICU is closed, and if the line fault no longer exists, the relay will remain closed.

Thermistor TH1 is provided in series with unit ICU and SCR Q3 in order to prevent excessive sustained dissipation in the event unit ICU might not trip open on the occurrence of a fault. Such failure to trip might, for example, be due to a faulty or incorrect ICU or an accidental ground ahead of unit ICU in the circuit. In such unlikely event, if high current remains through thermistor TH1 for an inordinate sustained period of time, it self-heats and having a positive temperature coefficient of resistance (PTC), its resistance at a predetermined high temperature point abruptly increases dramatically and current flow consequently drops accordingly. Further excessive power dissipation is terminated and the thermistor remains at an acceptable resistance and temperature point until unit ICU is manually turned off or open. This allows the thermistor to cool down where normal operation thereof recurs. It will be recalled, however, that regardless of any malfunction of unit ICU or its circuit, transistor Q4 will be turned off when SCR Q3 is gated on in response to an overload condition on the line immediately to cause an abrupt opening of the main relay MR.

The gate signal to SCR Q3 is supplied by the collector circuit of PNP transistor Q2 through resistor R18. Transistor Q2 in turn was turned on by the action of the collector of transistor Q1 turning on and supplying base current through resistor R19. Transistor Q1 was turned on as hereinbefore described by the output of comparator 26 going high in response to an overload on the line and supplying base current through resistor R15.

The remaining elements not heretofore mentioned have the following functions. Resistors R20, R21 and R22 are base-to-emitter by-pass resistors for transistors Q1, Q2 and Q4, respectively. Resistor R23 serves a similar gate-to-cathode by-pass function for SCR Q3. Capacitor C5 is an electrical noise suppressing capacitor for the SCR Q3 gate circuit. Resistor R24 and capacitor C6 provide a conventional dv/dt suppression circuit across the SCR to prevent unwanted turn-on due to rapidly rising transient voltage across the SCR. Diodes D10 and D11 form a reverse emf or "flyback" suppression network across the main relay coil to prevent high reverse voltage from being induced by the coil due to current interruption. Diode D9 primarily prevents damage to transistor Q4 if reverse polarity voltage should be applied thereto. A second benefit of diode D9 is that it provides an extra intrinsic voltage drop in series with transistor Q4 to aid its turn-off when SCR Q3 is gated on.

Metal oxide varistors MOV1 and MOV2 connected across the positive 28 volt D.C. supply and across indicator control unit ICU, respectively, absorb high voltage transients and thus prevent them from affecting the control elements. Capacitor C7 shunts any power-up voltage glitch from the base of transistor Q1 to prevent inadvertent turn-on thereof.

Thermal breaker 28 is provided for secondary protection to detect an overheating shunt resistor and cut off the power. This thermal breaker is a temperature sensing device which is mounted on the current sensing shunt resistor as shown at the upper left-hand portion of FIG. 2a. If for some reason the electronic circuit fails to function during an overload condition, a sustained overload will cause the shunt resistor to physically heat up. At a predetermined point, the thermal breaker will open the relay coil circuit directly causing the D.C. line to open at contact MR1. This thermal breaker is a eutectic type one-shot element preventing subsequent reclosing of the relay. This necessitates removal and replacement of the entire electronic module which should be done since the occurrence of such melting of the eutectic material indicates that the electronic sensing is not functional. If the primary electronic sensing is functional, the shunt resistor never would have attained a temperature sufficient to fuse the eutectic breaker on an overload.

Figure 3:
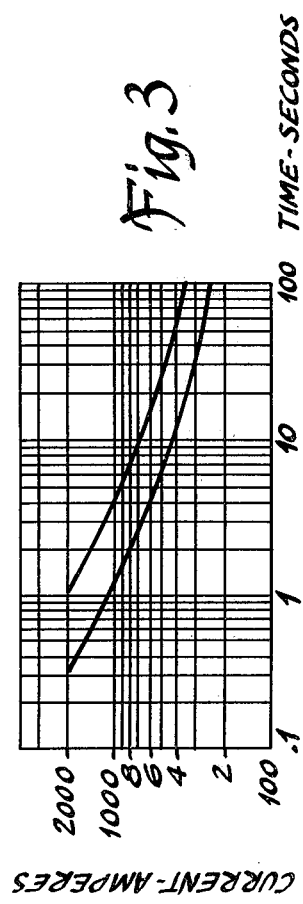
FIG. 3 is a graph having current plotted against time and showing the trip-time area wherein the circuit breaker will trip in response to overcurrent conditions.

As shown by the curve in FIG. 3, the time delay circuit has been designed so that for overload currents indicated by the ordinate, the relay will be tripped in the time ranges shown by the abscissa or the circuit breaker will function to protect the bus or load within the confines of the trip-time envelope.

Figure 4:
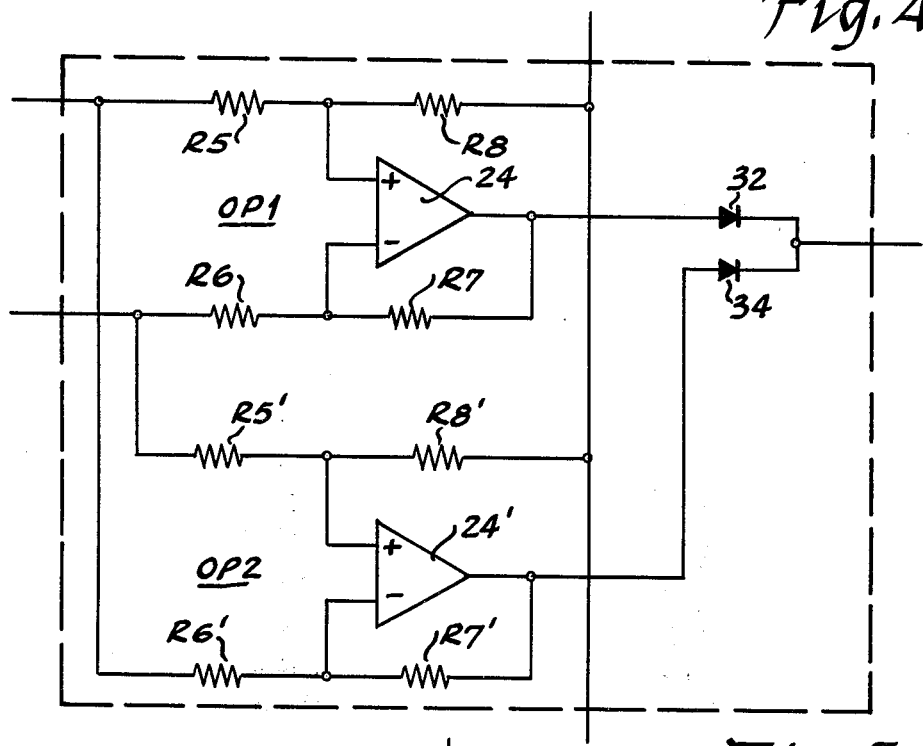
FIG. 4 is a partial circuit diagram showing a modification of the system of FIG. 2 to afford bi-directional current sensing.
Figure 5:
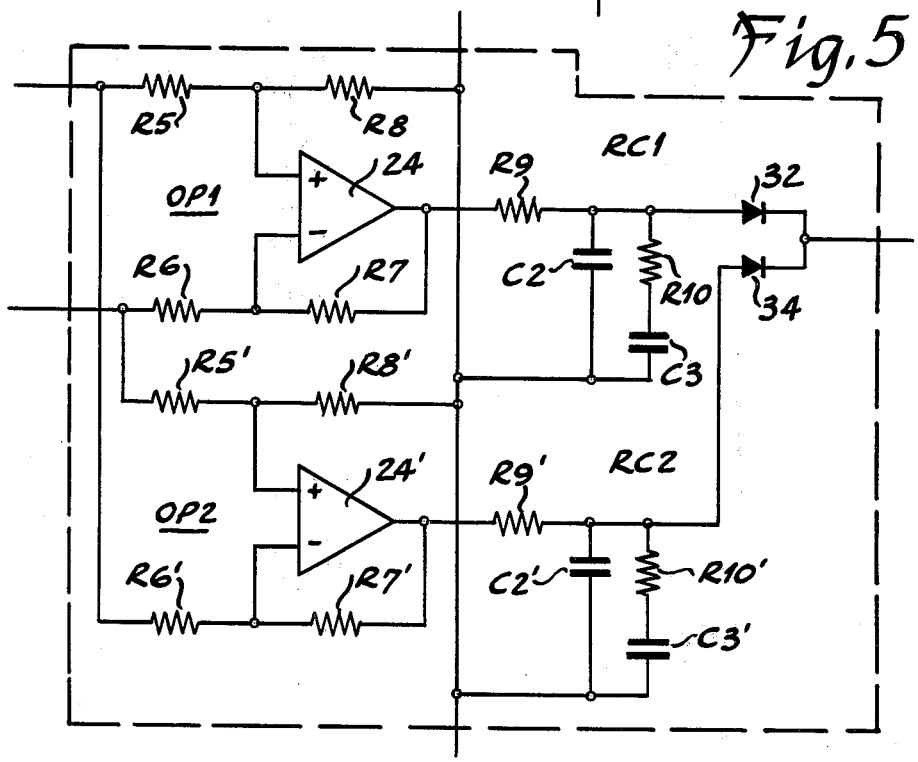
FIG. 5 is a partial circuit diagram showing another modification of the system of FIG. 2 to afford not only bi-directional current sensing as in FIG. 4 but also different trip time delays for the two overcurrent signals.

Although the system in FIG. 2a-b senses D.C. current in one direction only, it can be readily modified for bidirectional current sensing as shown by the variations in FIGS. 4 and 5. If the sub-circuit of FIG. 4 is substituted for the portion enclosed in dotted lines 30 in FIG. 2a, bidirectional sensing is accomplished. The upper amplifier OP1 in FIG. 4 is the same as the amplifier in FIG. 2a and like reference characters are used for the op amp element and resistors in each case. Referring to FIG. 4, it will be seen that bidirectional sensing can be accomplished by adding a like amplifier OP2 having its inputs cross-connected with the inputs of amplifier OP1 to the outputs of floating op amps 20 and 22 in FIG. 2a. The outputs of amplifiers OP1 and OP2 are applied through respective diodes 32 and 34 constituting an OR-logic to the time delay network 12 of FIG. 2.

With this modification, overload current in the right-hand direction through the shunt resistor will be sensed as in FIG. 2a causing amplifier OP1 to apply a trip signal through the OR-logic to the time delay network. On the other hand, current in the other direction through the shunt resistor will be sensed so as to cause amplifier OP2 to apply a trip signal through the OR-logic to the time delay network. For accuracy of operation in FIG. 2a, op amp 24 would be on the integrated circuit with op amp elements 20 and 22. In FIG. 4, elements 24 and 24' would be on the same integrated circuit with elements 20 and 22.

While the modification of FIG. 4 just described provides the same time delay in the trip signal for both directions of current sensing, different time delays may be provided therefor as shown in FIG. 5. The amplifiers OP1 and OP2 are similar to those in FIG. 4 but FIG. 5 differs in that amplifier OP2 is provided with its own time delay network RC2 which may be similar to or different from time delay network RC1 as to its time delay function. This may be accomplished by giving resistors R9' and R10' and capacitors C2' and C3' different values from those in time delay network RC1. The outputs of the two time delay networks are then applied through respective diodes 32 and 34 which function as an OR-logic to resistor R9 in FIG. 2a.

These bidirectional sensing versions have application in D.C. systems where starting current of one direction from a battery may be sensed initially followed by sensing of generated current of the other direction fed back to the battery, for example.

While the systems hereinbefore described are effectively adapted to fulfill the objects stated, it is to be understood that the invention is not intended to be confined to the particular preferred embodiments of electronic remote control D.C. power controller and circuit breaker disclosed, inasmuch as they are susceptible of various modifications without departing from the scope of the appended claims.

I claim:

1. In an electrical system having an overload relay in a D.C. power line connecting a D.C. power source to a load device and said relay including D.C. power contacts in said power line and electromagnetic coil means for closing and opening said contacts, electronic means for controlling said relay comprising:

an electronic control circuit supplied from said D.C. source with unidirectional power with respect to ground of said D.C. power source responsive to an external manual control signal for operating said coil means to close said D.C. power contacts and being responsive to an overcurrent trip signal for operating said coil means to trip said D.C. power contacts open;

and an electronic detector circuit responsive to an overcurrent on said D.C. power line for providing said trip signal to said electronic control circuit comprising:

a resistor connected in said D.C. power line for providing an input signal proportional to the current in said line;

an amplifier having a floating input portion and an output portion referenced to said ground;

an input bridge circuit responsive to said input signal when unbalanced thereby for applying a compatible reduced signal to said amplifier, and comprising means for suppressing positive and negative transients and means operative with said floating input portion of said amplifier for effecting common mode rejection in said input signal and means in said output portion providing an amplified output signal in response to said amplifier input signal;

a time delay network referenced to said ground for modifying said amplified output signal;

a threshold comparator including means applying a reference voltage thereto with respect to said ground against which the modified signal from said time delay network is compared to provide an output signal with respect to said ground when said input signal is above a predetermined value indicative of an overload condition in said D.C. power line;

and logic circuit means referenced to said ground responsive to said comparator output signal for providing said trip signal to said electronic control circuit thereby to trip said D.C. power contacts open.

2. The electrical system claimed in claim 1, wherein: said means for suppressing positive transients comprises:
a power supply circuit supplied from said source and comprising a regulating element connected therefrom to ground for regulating the supply voltage to said electronic detector circuit;
and unidirectional conducting means connecting said input bridge circuit to said regulating element to suppress positive voltage transients in said input signal.

3. The electrical system claimed in claim 2, wherein; said means for suppressing negative transients comprises:
unidirectional conducting means connecting said ground to said input bridge circuit for suppressing negative voltage transients in said input signal.

4. The electrical system claimed in claim 3, wherein: said means applying a reference signal to said threshold comparator comprises:
a voltage control circuit supplied from said D.C. power source for supplying said reference voltage;
and a regulating element connected from said voltage control circuit to ground for regulating said reference voltage.

5. The electrical system claimed in claim 1, wherein: said overload relay also includes an operating coil for said power contacts and a coil operating circuit;
and said coil operating circuit comprises a thermal breaker in close relationship with said resistor and responsive to said resistor reaching a predetermined temperature in the event said electronic control circuit fails to trip said D.C. power contacts open in response to an overcurrent condition for interrupting said coil operating circuit.

6. The electrical system claimed in claim 1, wherein: said time delay network referenced to said ground for modifying said amplified output signal comprises;
a dual RC network comprising a first RC circuit having values for primarily determining the shape of the trip characteristic at high overload current levels and a second RC circuit having different values for primarily determining the shape of the trip characteristic at low overload current levels.

7. In an electrical system having an overload relay in a D.C. power line connecting a D.C. power source to a load device and said relay including D.C. power contacts in said power line and electromagnetic coil means for closing and opening said contacts to control application of power to said load device, electronic means for controlling said relay comprising:
an electronic control circuit supplied from said D.C. source with unidirectional power with respect to ground of said D.C. power source responsive to external manual control signals for operating said coil means to close or open said D.C. power contacts and being responsive to an overcurrent trip signal for operating said coil means to trip said D.C. power contacts open;
and an electronic detector circuit responsive to bidirectional overcurrents on said D.C. power line for providing said trip signal to said electronic control circuit comprising:
a resistor connected in said D.C. power line for providing input signals proportional to respective bidirectional currents in said line;
amplifier means comprising floating input means and output means referenced to said ground;
an input bridge circuit responsive to said input signals for applying respective compatible input signals to said amplifier means, and comprising means for supressing transients and means operative with said floating input means for effecting common mode rejection in either input signal and means in said output means providing an amplified, ground-referenced output signal in response to each input signal to said amplifier means;
time delay means referenced to said ground for modifying said amplified output signal;
a threshold comparator including means applying a reference voltage thereto with respect to said ground against which the modified signal from said time delay means is compared to provide an output signal with respect to said ground when said input signal is above a predetermined value indicative of an overload condition in said D.C. power line;
and logic circuit means referenced to said ground responsive to said comparator output signal for providing said trip signal to said electronic control circuit thereby to trip said D.C. power contacts open.

8. The electrical system claimed in claim 7, wherein: said ground-referenced output means comprises a pair of operational amplifiers cross-connected to said floating input means for amplifying the respective compatible input signals resulting from the bidirectional overload currents on the D.C. power line;
and an OR-logic circuit through which the outputs of said operational amplifiers are applied to said threshold comparator.

9. The electrical system claimed in claim 8, wherein said time delay means comprises:
a pair of time delay networks having different time delays connected between the outputs of said operational amplifiers and said OR-logic circuit.

* * * * *